United States Patent
Wang et al.

(10) Patent No.: US 11,228,345 B1
(45) Date of Patent: Jan. 18, 2022

(54) ELECTRONIC DEVICES HAVING DIFFERENTIAL-FED NEAR-FIELD COMMUNICATIONS ANTENNAS

(71) Applicant: Apple Inc., Cupertino, CA (US)

(72) Inventors: Yiren Wang, Cupertino, CA (US); Daisong Zhang, Cupertino, CA (US); Erdinc Irci, Sunnyvale, CA (US); Han Wang, Campbell, CA (US); Hongfei Hu, Cupertino, CA (US); Jingni Zhong, Santa Clara, CA (US); Liang Han, Sunnyvale, CA (US); Mattia Pascolini, San Francisco, CA (US); Ming Chen, Cupertino, CA (US); Nanbo Jin, San Jose, CA (US); Tiejun Yu, Fremont, CA (US); Yijun Zhou, Mountain View, CA (US); Yuan Tao, Cupertino, CA (US); Yuancheng Xu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/028,877

(22) Filed: Sep. 22, 2020

(51) Int. Cl.
| | |
|---|---|
| *H04B 5/00* | (2006.01) |
| *H04B 5/02* | (2006.01) |
| *H04B 1/00* | (2006.01) |
| *H04B 1/38* | (2015.01) |
| *H04B 7/0413* | (2017.01) |
| *H04W 88/02* | (2009.01) |
| *H04B 1/40* | (2015.01) |

(52) U.S. Cl.
CPC ............... *H04B 5/02* (2013.01); *H04B 1/40* (2013.01); *H04B 5/0075* (2013.01)

(58) Field of Classification Search
None
See application file for complete search history.

(56) References Cited

U.S. PATENT DOCUMENTS

| | | | |
|---|---|---|---|
| 9,325,080 B2 | 4/2016 | Ouyang et al. | |
| 9,793,616 B2 | 10/2017 | Ouyang et al. | |
| 10,158,384 B1* | 12/2018 | Yarga | H01Q 13/103 |
| 10,193,597 B1* | 1/2019 | Garrido Lopez | H04B 5/0025 |
| 10,200,092 B1* | 2/2019 | Irci | H04B 5/02 |
| 10,263,335 B2 | 4/2019 | Zhou et al. | |
| 10,476,170 B2* | 11/2019 | Rajagopalan | H01Q 3/38 |
| 10,477,675 B1* | 11/2019 | Kim | H04M 1/0277 |

(Continued)

*Primary Examiner* — Tuan A Tran
(74) *Attorney, Agent, or Firm* — Treyz Law Group, P.C.; Michael H. Lyons

(57) ABSTRACT

A device with near-field communications (NFC) capabilities is provided. A housing may include first and second segments and a support plate separated from the segments by a slot. A first inductor may be coupled between the first segment and the plate. A second inductor may be coupled between the second segment and the plate. A transceiver may have a first signal terminal coupled to the first segment over a first path and a second signal terminal coupled to the second segment over a second path. The transceiver may convey differential signals in an NFC band over a loop path for an NFC antenna that includes the first conductive path, the first segment, the first inductor, a portion of the plate between the first and second inductors, the second inductor, the second segment, and the second conductive path. This may optimize wireless performance and volume for the NFC antenna.

20 Claims, 8 Drawing Sheets

(56) References Cited

U.S. PATENT DOCUMENTS

| | | | |
|---|---|---|---|
| 10,547,339 B2 * | 1/2020 | Shiu .................... | H01Q 1/243 |
| 10,581,153 B2 * | 3/2020 | Edwards ............... | H05K 5/0247 |
| 10,644,758 B2 * | 5/2020 | Irci ...................... | H04B 5/0031 |
| 10,651,542 B2 | 5/2020 | Choi et al. | |
| 10,741,916 B2 | 8/2020 | Li et al. | |
| 10,804,617 B2 * | 10/2020 | Zhou ................... | H01Q 9/0421 |
| 10,833,410 B2 * | 11/2020 | Ayala Vazquez ........ | H01Q 9/42 |
| 10,847,901 B1 * | 11/2020 | Ayala Vazquez ...... | H01Q 1/245 |
| 10,886,607 B2 * | 1/2021 | Ayala Vazquez ........ | H01Q 1/44 |
| 10,916,832 B2 * | 2/2021 | Azad .................... | H01Q 1/523 |

* cited by examiner

US 11,228,345 B1

ELECTRONIC DEVICES HAVING DIFFERENTIAL-FED NEAR-FIELD COMMUNICATIONS ANTENNAS

BACKGROUND

This relates generally to electronic devices and, more particularly, to electronic devices with wireless communications capabilities.

Electronic devices with wireless communications capabilities include wireless circuitry with one or more antennas. To satisfy consumer demand for small form factor electronic devices, manufacturers are continually striving to implement wireless circuitry such as antenna components using compact structures. At the same time, there is a desire for wireless devices to cover a growing number of communications bands. For example, it may be desirable for a wireless device to cover a near-field communications band while also covering additional non-near-field (far-field) bands. Because antennas have the potential to interfere with each other and with other components in a wireless device, it can be difficult to provide wireless circuitry that handles both near-field and non-near-field communications bands with satisfactory levels of wireless performance.

It would therefore be desirable to be able to provide improved wireless circuitry for electronic devices.

SUMMARY

An electronic device may be provided with wireless circuitry and a housing having peripheral conductive housing structures and a conductive support plate. The wireless circuitry may include non-near-field communications antennas coupled to non-near-field communications transceiver circuitry. The non-near-field communications antennas may handle non-near-field communications signals such as cellular telephone signals. The wireless circuitry may include a near-field communications antenna coupled to near-field communications circuitry. The near-field communications antenna may handle near-field communications signals such as radio-frequency signals at 13.56 MHz.

A dielectric-filled gap in the peripheral conductive housing structures may divide the structures into first and second segments. The conductive support plate may be separated from the first and second segments by a slot. A first inductor may be coupled between a first terminal on the first segment and a second terminal on the conductive support plate. A second inductor may be coupled between a third terminal on the second segment and a fourth terminal on the conductive support plate. A portion of the conductive support plate may extend from the second terminal to the fourth terminal. Far-field antenna feeds may be coupled to the first and second segments at locations between the first and third terminals, respectively, and additional dielectric-filled gaps in the peripheral conductive housing structures.

The NFC transceiver circuitry may have first and second differential signal terminals. The first differential signal terminal may be coupled to the first segment over a first conductive path. The second differential signal terminal may be coupled to the second segment over a second conductive path. Additional inductors may be interposed on the first and second conductive paths. The NFC transceiver circuitry may convey differential signals in an NFC band over a conductive loop path for an NFC antenna in the device. The conductive loop path may include at least a portion of the first conductive path, at least a portion of the first segment, the first inductor, the portion of the conductive support plate, the second inductor, at least a portion of the second segment, and at least a portion of the second conductive path. This may serve to optimize the wireless performance of the NFC antenna while also maximizing the volume of the NFC antenna.

DETAILED DESCRIPTION

Figure 1:
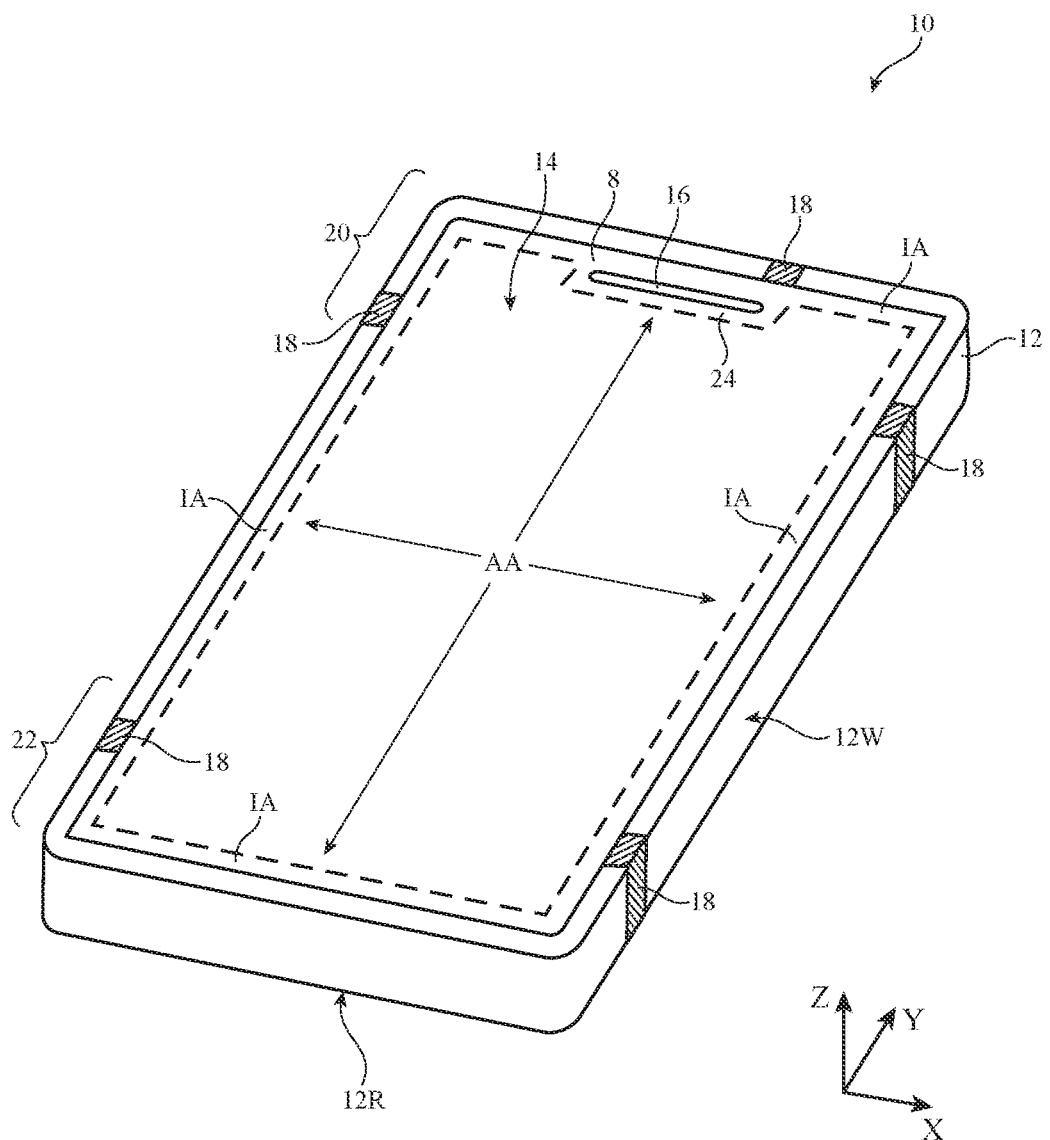
FIG. 1 is a perspective view of an illustrative electronic device in accordance with some embodiments.

Electronic devices such as device 10 of FIG. 1 may be provided with wireless communications circuitry. The wireless communications circuitry may be used to support wireless communications in multiple wireless communications bands. For example, the wireless communications circuitry may be used to support wireless communications in near-field communications (NFC) and non-near-field communications (non-NFC) bands.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 8 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 8 of inactive area IA). Notch 8 may be a substantially rectangular region that is surrounded (defined) on three sides by active area AA and on a fourth side by peripheral conductive housing structures 12W.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 8 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas (as an example). An upper antenna may, for example, be formed in upper region 20 of device 10. A lower antenna may, for example, be formed in lower region 22 of device 10. Additional antennas may be formed along the edges of housing 12 extending between regions 20 and 22 if desired. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
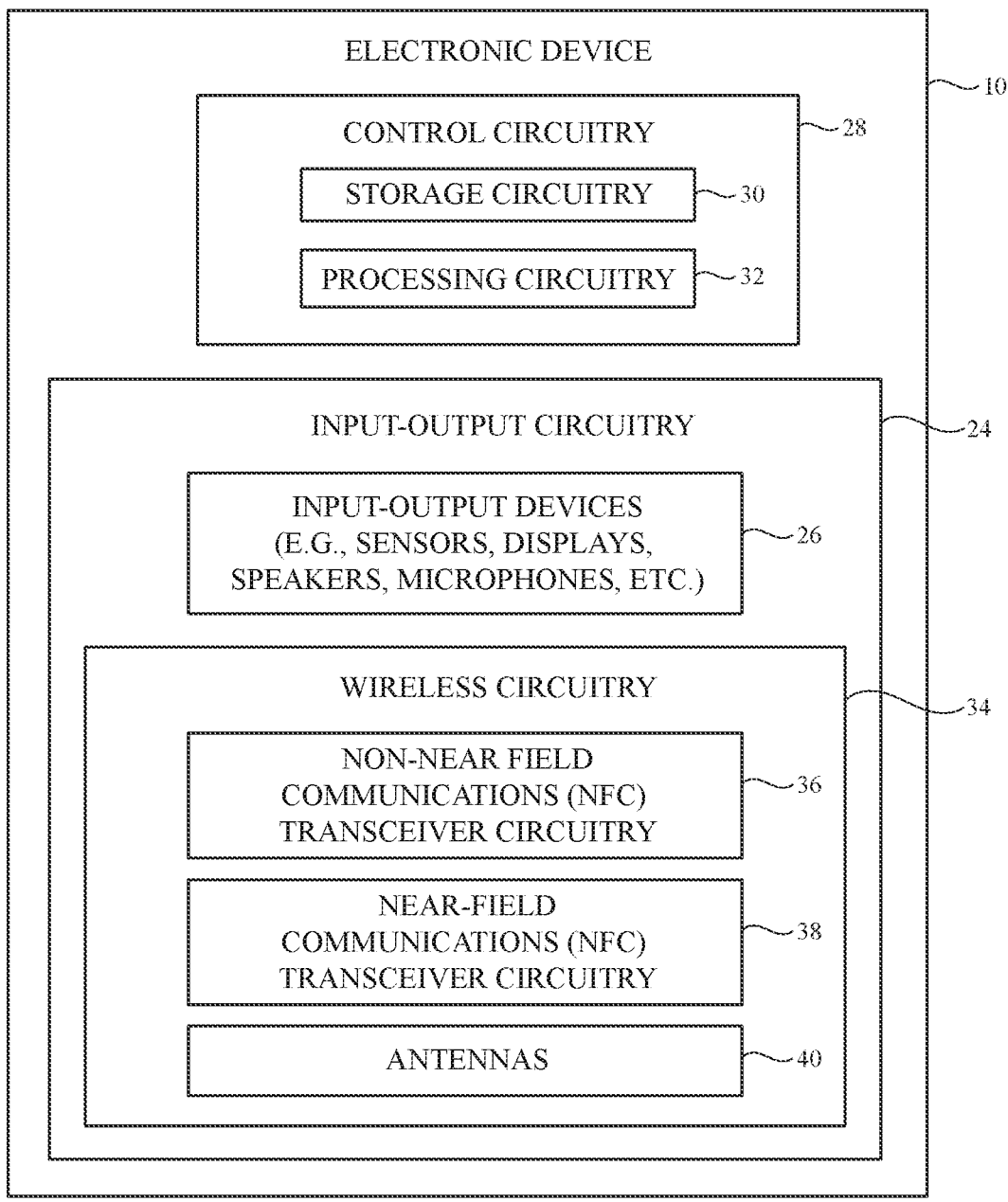
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 28. Control circuitry 28 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 32.

Processing circuitry 32 may be used to control the operation of device 10. Processing circuitry 32 may include on one or more microprocessors, microcontrollers, digital signal processors, host processors, baseband processor integrated circuits, application specific integrated circuits, central processing units (CPUs), etc. Control circuitry 28 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 28 may be used to run software on device 10 such as internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 24 may include wireless circuitry such as wireless circuitry 34 for wirelessly conveying radio-frequency signals. While control circuitry 28 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 28 (e.g., portions of control circuitry 28 may be implemented on wireless circuitry 34). As an example, control circuitry 28 may include baseband processor circuitry or other control components that form a part of wireless circuitry 34.

Wireless circuitry 34 may include non-near-field communications (non-NFC) transceiver circuitry 36 (sometimes referred to herein as far-field transceiver circuitry 36). Non-NFC transceiver circuitry 36 may include transceiver circuitry for handling non-NFC communications (e.g., far-field communications using radio-frequency signals conveyed in non-NFC frequency bands). Frequency bands may sometimes be referred to herein as communications bands or simply as "bands" and may span corresponding ranges of frequencies.

The transceiver circuitry in non-NFC transceiver circuitry 36 may include, for example, wireless local area network (WLAN) transceiver circuitry that handles 2.4 GHz and 5 GHz bands for Wi-Fi® (IEEE 802.11) communications, wireless personal area network (WPAN) transceiver circuitry that handles the 2.4 GHz Bluetooth® communications band, cellular telephone transceiver circuitry that handles cellular telephone bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), satellite navigation receiver circuitry that handles satellite navigation bands (e.g., a GPS band from 1565 to 1610 MHz, a Global Navigation Satellite System (GLONASS) band, a BeiDou Navigation Satellite System (BDS) band, etc.), ultra-wideband (UWB) transceiver circuitry that handles communications using the IEEE 802.15.4 protocol and/or other ultra-wideband communications protocols, and/or any other desired radio-frequency transceiver circuitry for covering any other desired non-NFC bands of interest. The radio-frequency signals handled by non-NFC transceiver circuitry 36 may propagate in the electromagnetic far-field domain (e.g., over a distance of several feet, several meters, tens of meters, hundreds of meters, thousands of meters, miles, hundreds of miles, etc.). The radio-frequency signals handled by non-NFC transceiver circuitry 36 may sometimes be referred to herein as non-NFC signals or far-field signals.

Wireless circuitry 34 may also include near-field communications (NFC) transceiver circuitry 38 (sometimes referred to herein as NFC circuitry 38, NFC transceiver circuits 38, NFC transceiver 38, near-field circuitry 38, near-field transceiver circuitry 38, or near-field transceiver 38). NFC transceiver circuitry 38 may generate and/or receive radio-frequency signals in an NFC frequency band (e.g., at 13.56 MHz). These radio-frequency signals may sometimes be referred to herein as NFC signals.

The NFC signals may be used to support communications between device 10 and an NFC reader or other external NFC equipment. The NFC signals handled by NFC transceiver circuitry 38 may propagate in the electromagnetic near-field domain (e.g., via electromagnetic near-field coupling over a distance of less than a foot, 20 cm or less, etc.). Near-field communications may, for example, be supported using loop antennas (e.g., to support inductive near-field communications in which a loop antenna in device 10 is electromagnetically near-field coupled to a corresponding loop antenna in an overlapping or adjacent NFC reader). NFC links typically are formed over distances of 20 cm or less (e.g., device 10 must be placed in the vicinity of the near-field communications reader for effective communications).

Non-NFC transceiver circuitry 36 and NFC transceiver circuitry 38 may each include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies. Non-NFC transceiver circuitry 36 may be omitted if desired.

As shown in FIG. 2, wireless circuitry 34 may include antennas 40. Non-NFC transceiver circuitry 36 may convey non-NFC signals at frequencies greater than 100 MHz using one or more antennas 40. NFC transceiver circuitry 38 may convey NFC signals below 100 MHz (e.g., in an NFC frequency band at 13.56 MHz) using one or more antennas 40. In general, transceiver circuitry 36 and 38 may be configured to cover (handle) any suitable communications (frequency) bands of interest. The transceiver circuitry may convey radio-frequency signals using antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. In another suitable arrangement, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals). Different types of antennas may be used for different bands and combinations of bands. Antennas 40 that are used to convey non-NFC signals may sometimes be referred to herein as non-NFC antennas or far-field antennas. Antennas 40 that are used to convey NFC signals may sometimes be referred to herein as NFC antennas.

In one suitable arrangement that is sometimes described herein as an example, antennas 40 may include an NFC antenna that includes a conductive loop path (e.g., a conductive loop path that forms a loop antenna resonating element that is used to convey NFC signals for NFC transceiver circuitry 38). The conductive loop path may run through the antenna resonating element of one or more of the non-NFC antennas that are used to convey non-NFC signals for non-NFC transceiver circuitry 36 (e.g., the loop antenna resonating element for the NFC antenna may include portions of the antenna resonating element of one or more non-NFC antennas).

Figure 3:
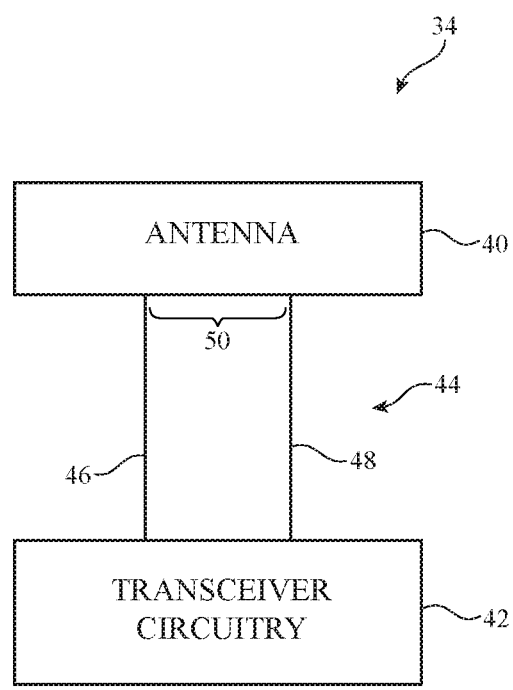
FIG. 3 is a schematic diagram of illustrative wireless circuitry in accordance with some embodiments.

FIG. 3 is a schematic diagram showing how a given antenna 40 may be fed by corresponding transceiver circuitry. As shown in FIG. 3, antenna 40 may be coupled to transceiver circuitry 42 (e.g., transceiver circuitry such as NFC transceiver circuitry 38 or non-NFC transceiver circuitry 36 of FIG. 2). Transceiver circuitry 42 may be coupled to antenna feed 50 of antenna 40 using a transmission line path that includes radio-frequency transmission line 44. Radio-frequency transmission line 44 may include a first signal conductor such as signal conductor 46 (e.g., a positive signal conductor) and may include a second signal conductor such as signal conductor 48 (e.g., a ground signal conductor). Conductor 48 may, for example, be coupled to the antenna ground for antenna 40 (e.g., over a ground antenna feed terminal of antenna feed 50 located at the antenna ground). Conductor 46 may, for example, be coupled to the antenna resonating element for antenna 40 (e.g., over a positive antenna feed terminal of antenna feed 50 located at the antenna resonating element).

In scenarios where antenna 40 is used to convey NFC signals, antenna 40 may sometimes be referred to herein as NFC antenna 40NFC. In some scenarios, the NFC antenna is fed single-ended NFC signals using a single-ended radio-frequency transmission line (e.g., antenna feed 50 may be a single-ended antenna feed). In one suitable arrangement that is described herein as an example, the NFC antenna is fed differential NFC signals using a differential radio-frequency transmission line (e.g., antenna feed 50 may be a differential antenna feed having differential antenna feed terminals and the NFC antenna may be a differential-fed NFC antenna).

Radio-frequency transmission line 44 may include a stripline transmission line (sometimes referred to herein simply as a stripline), a coaxial cable, a coaxial probe realized by metalized vias, a microstrip transmission line, an edge-coupled microstrip transmission line, an edge-coupled stripline transmission lines, a waveguide structure, combinations of these, etc. Multiple types of transmission lines may be used to form the transmission line path that couples transceiver circuitry 42 to antenna feed 50. Filter circuitry, switching circuitry, impedance matching circuitry, phase shifter circuitry, balun circuitry, amplifier circuitry, and/or other circuitry may be interposed on radio-frequency transmission line 44, if desired.

Radio-frequency transmission lines in device 10 may be integrated into ceramic substrates, rigid printed circuit boards, and/or flexible printed circuits. In one suitable arrangement, radio-frequency transmission lines in device 10 may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Figure 4:
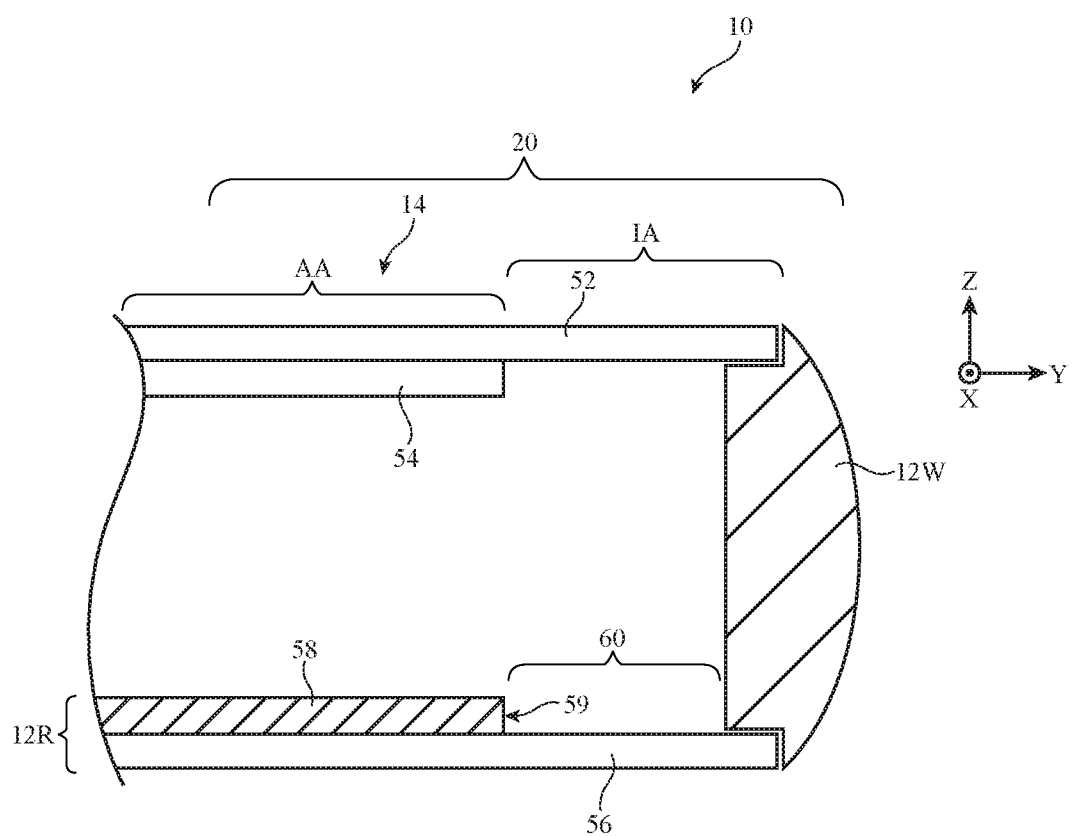
FIG. 4 is a cross-sectional side view of an electronic device having housing structures that may be used in forming antenna structures in accordance with some embodiments.

If desired, conductive electronic device structures such as conductive portions of housing 12 (FIG. 1) may be used to form part of one or more of the antennas 40 in device 10. FIG. 4 is a cross-sectional side view of upper region 20 of device 10, showing illustrative conductive electronic device structures that may be used in forming one or more of the antennas 40 in device 10.

As shown in FIG. 4, peripheral conductive housing structures 12W may extend around the lateral periphery of device 10 (e.g., as measured in the X-Y plane) and may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 4 (e.g., a top sidewall that runs along the top edge of device 10 and that extends across the width of device 10 within upper region 20, as shown in FIG. 1).

Display 14 may have a display module such as display module 54 (sometimes referred to as a display panel). Display module 54 may include pixel circuitry, touch sensor circuitry, force sensor circuitry, and/or any other desired circuitry for forming active area AA of display 14. Display 14 may include a dielectric cover layer such as display cover layer 52 that overlaps display module 54. Display cover layer 52 may include plastic, glass, sapphire, ceramic, and/or any other desired dielectric materials. Display module 54 may emit image light and may receive sensor input (e.g., touch and/or force sensor input) through display cover layer 52. Display cover layer 52 and display 14 may be mounted to peripheral conductive housing structures 12W. The lateral area of display 14 that does not overlap display module 54 may form inactive area IA of display 14.

As shown in FIG. 4, rear housing wall 12R may be mounted to peripheral conductive housing structures 12W (e.g., opposite display 14). Rear housing wall 12R may include a conductive layer such as conductive support plate 58. Conductive support plate 58 may extend across an entirety of the width of device 10 (e.g., between the left and right edges of device 10 as shown in FIG. 1 and parallel to the X-axis of FIG. 4). Conductive support plate 58 may have an edge 59 that is separated from peripheral conductive housing structures 12W by dielectric-filled slot 60 (sometimes referred to herein as opening 60, gap 60, or aperture 60). Slot 60 may be filled with air, plastic, ceramic, or other dielectric materials. Conductive support plate 58 may, if desired, provide structural and mechanical support for device 10.

If desired, rear housing wall 12R may include a dielectric cover layer such as dielectric cover layer 56. Dielectric cover layer 56 may include glass, plastic, sapphire, ceramic, one or more dielectric coatings, or other dielectric materials. Dielectric cover layer 56 may be layered under conductive support plate 58 (e.g., conductive support plate 58 may be coupled to an interior surface of dielectric cover layer 56). If desired, dielectric cover layer 56 may extend across an entirety of the width of device 10 and/or an entirety of the length of device 10 (e.g., between the upper and lower edges of device 10 as shown in FIG. 1 and parallel to the Y-axis of FIG. 4). Dielectric cover layer 56 may overlap slot 60. If desired, dielectric cover layer 56 be provided with pigmentation and/or an opaque masking layer (e.g., an ink layer) that helps to hide the interior of device 10 from view. In another suitable arrangement, dielectric cover layer 56 may be omitted and slot 60 may be filled with a solid dielectric material.

Conductive housing structures such as conductive support plate 58 and/or peripheral conductive housing structures 12W (e.g., the portion of peripheral conductive housing structures 12W opposite conductive support plate 58 at slot 60) may be used to form antenna structures for one or more of the antennas 40 in device 10. For example, conductive support plate 58 may be used to form the ground plane for one or more of the NFC antennas in device 10 and/or to form one or more edges of a slot antenna resonating element (e.g., a slot antenna resonating element formed from a portion of slot 60) for a non-NFC antenna. Peripheral conductive housing structures 12W may form an antenna resonating element arm for one or more of the non-NFC antennas in device 10. A portion of peripheral conductive housing structures 12W and/or a portion of conductive support plate 58 (e.g., at edge 59 of slot 60) may form part of a conductive loop path used to form a loop antenna resonating element for an NFC antenna in device 10.

Figure 5:
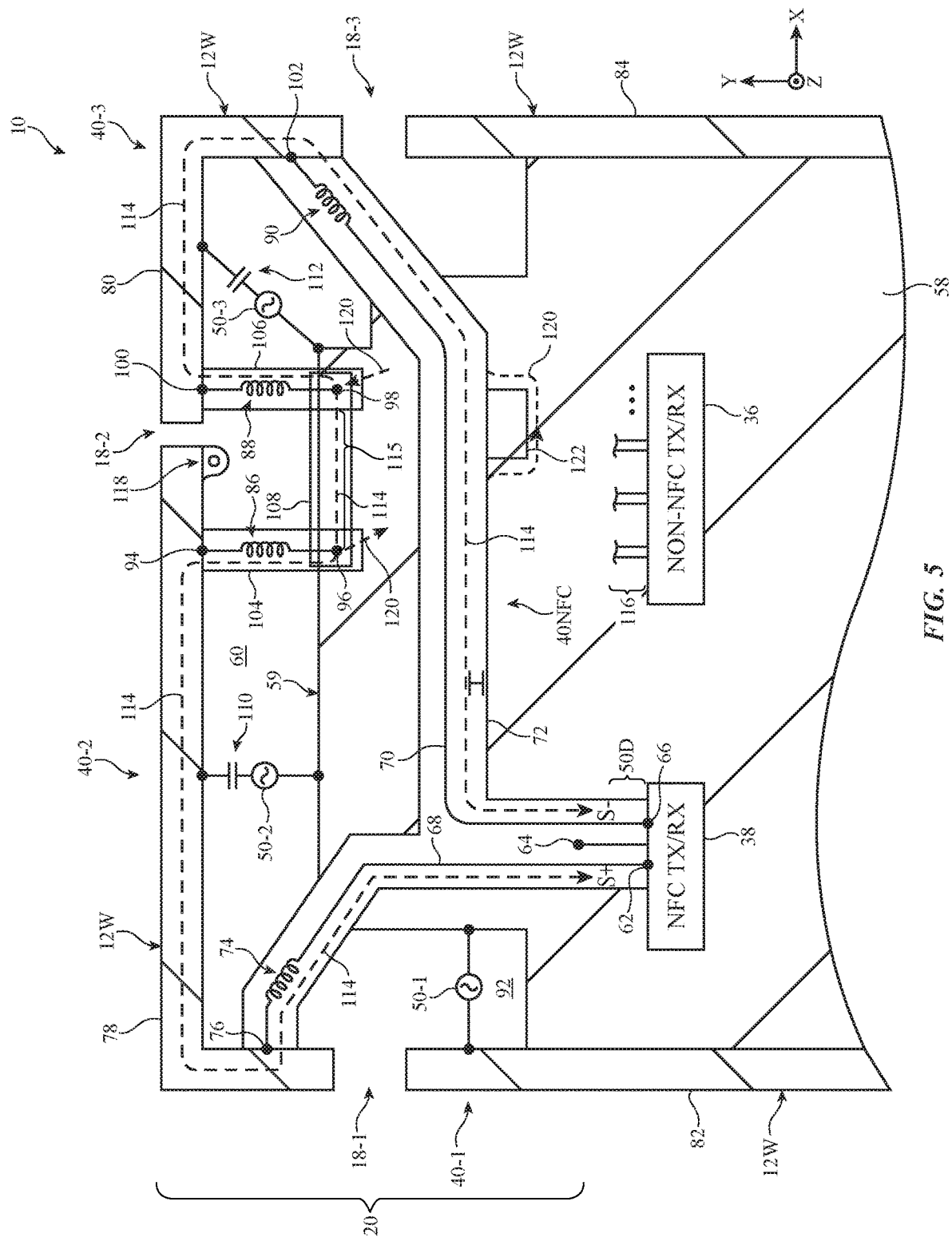
FIG. 5 is a top view of an illustrative electronic device having a differential-fed near-field communications antenna formed at least in part from non-near-field antenna structures in accordance with some embodiments.

FIG. 5 is a top interior view showing how upper region 20 of device 10 may include an NFC antenna and one or more non-NFC antennas. Display 14 has been removed from the view shown in FIG. 5 for the sake of clarity. While FIG. 5 illustrates antenna structures in upper region 20 of device 10, the structures of FIG. 5 may additionally or alternatively be formed in lower region 22 (FIG. 1) or other portions of device 10.

As shown in FIG. 5, peripheral conductive housing structures 12W may include a first conductive sidewall at the left edge of device 10, a second conductive sidewall at the top edge of device 10 (e.g., as shown in the cross-sectional side view of FIG. 4), and a third conductive sidewall at the right edge of device 10. Peripheral conductive housing structures 12W may be segmented by dielectric-filled gaps 18 such as a first gap 18-1, a second gap 18-2, and a third gap 18-3. Gaps 18-1, 18-2, and 18-3 may be filled with plastic, ceramic, sapphire, glass, epoxy, or other dielectric materials. The dielectric material in gaps 18-1, 18-2, and 18-3 may lie flush with peripheral conductive housing sidewalls 12W at the exterior surface of device 10 if desired.

Gap 18-1 may divide the first conductive sidewall to separate segment 82 of peripheral conductive housing structures 12W from segment 78 of peripheral conductive housing structures 12W. Gap 18-2 may divide the second conductive sidewall to separate segment 78 from segment 80 of peripheral conductive housing structures 12W. Gap 18-3 may divide the third conductive sidewall to separate segment 80 from segment 84 of peripheral conductive housing structures 12W. Segment 78 may form the top-left corner of device 10 and may be formed from the first and second conductive sidewalls of peripheral conductive housing structures 12W. Segment 80 may form the top-right corner of device 10 and may be formed from the second and third conductive sidewalls of peripheral conductive housing structures 12W. Segment 78 may include a gap support structure for (at) gap 18-2 such as knuckle 118. Knuckle 118 may provide mechanical support to peripheral conductive housing structures 12W at gap 18-2, may help to secure dielectric material in place within slot 60, and/or may be used to help hold electronic components in place within device 10.

Conductive support plate 58 may extend between opposing sidewalls of peripheral conductive housing structures 12W. For example, conductive support plate 58 may extend from segment 82 to segment 84 of peripheral conductive housing structures 12W (e.g., across the width of device 10). Conductive support plate 58 may be welded or otherwise affixed to segments 82 and 84. In another suitable arrangement, conductive support plate 58, segment 84, and segment 82 may be formed from a single, integral (continuous) piece of machined metal (e.g., in a unibody configuration). Conductive support plate 58 may include one or more openings such as opening 122. Openings such as opening 122 may be used to accommodate other components in device 10, may be used to reduce the cost or weight of device 10, may be used to form antenna windows for other antennas mounted within device 10 (e.g., for radiating through rear housing wall 12R of FIG. 4), etc.

Edge 59 of conductive support plate 58 may be separated from segment 78 and segment 80 of peripheral conductive housing structures 12W by slot 60. Knuckle 118 at gap 18-2 may, for example, include conductive material from segment 78 that extends into and/or over slot 60. If desired, slot 60 may include an extended portion 92 that is interposed between edge 59 of conductive support plate 58 and segment 82 of peripheral conductive housing structures 12W. One or more antennas such as a one-dimensional phased antenna array for conveying millimeter and centimeter wave signals and a planar inverted-F antenna for conveying other signals may at least partially overlap slot 60 (not shown in FIG. 5 for the sake of clarity). Slot 60 may be filled with air, plastic, glass, sapphire, epoxy, ceramic, or other dielectric material. Slot 60 may be continuous with gaps 18-1, 18-2, and 18-3 in peripheral conductive housing structures 12W if desired (e.g., a single piece of dielectric material may be used to fill both slot 60 and gaps 18-1, 18-2, and 18-3).

As shown in FIG. 5, upper region 20 of device 10 may include at least a first non-NFC antenna 40-1, a second non-NFC antenna 40-2, and a third non-NFC antenna 40-3. Non-NFC antennas 40-1, 40-2, and 40-3 may include an antenna ground (sometimes referred to herein as antenna ground structures or an antenna ground plane) formed from conductive support plate 58 and segments 82 and 84 of peripheral conductive housing structures 12W, as an example. Additional conductive components such as conductive housing structures, conductive structures from electronic components, printed circuit board traces, strips of conductor such as strips of wire or metal foil, conductive display components, and/or other conductive structures may also form part of the antenna ground.

Non-NFC transceiver (TX/RX) circuitry 36 may feed non-NFC signals for non-NFC antennas 40-1, 40-2, and 40-3 over one or more respective radio-frequency transmission lines 116 (e.g., radio-frequency transmission lines such as radio-frequency transmission line 44 of FIG. 4). Each non-NFC antenna may have a corresponding antenna feed 50 coupled to a respective radio-frequency transmission line 116 (e.g., non-NFC antenna 40-1 may include (far-field) antenna feed 50-1, non-NFC antenna 40-2 may include (far-field) antenna feed 50-2, and non-NFC antenna 40-3 may include (far-field) antenna feed 50-3). This example is merely illustrative and, if desired, each non-NFC antenna may include multiple antenna feeds or other feeding arrangements may be used.

As shown in FIG. 5, non-NFC antenna 40-1 may have an open slot antenna resonating element formed from extended portion 92 of slot 60. Antenna feed 50-1 for non-NFC antenna 40-1 may be coupled to segment 82 of peripheral conductive housing structures 12W and conductive support plate 58 (e.g., across extended portion 92 of slot 60). Corresponding antenna currents for non-NFC antenna 40-1 may flow around the perimeter of extended portion 92 of slot 60 (e.g., in one or more non-NFC frequency bands). If desired, one or more antenna tuning components (e.g., components having fixed and/or adjustable inductors, capacitors, resistors, filters, and/or switches coupled together in any desired arrangement) may be coupled across extended portion 92 of slot 60. The frequency response of non-NFC antenna 40-1 may be determined by the length of the perimeter of extended portion 92 of slot 60, one or more harmonic modes of extended portion 92, contribution from one or more parasitic elements, and/or antenna tuning components coupled across extended portion 92 of slot 60, for example.

Non-NFC antenna 40-2 may have an antenna resonating element arm (e.g., an inverted-F antenna resonating element arm) formed from segment 78 of peripheral conductive housing structures 12W. Antenna feed 50-2 for non-NFC antenna 40-2 may be coupled to segment 78 and conductive support plate 58 (e.g., across slot 60). Corresponding antenna currents for non-NFC antenna 40-2 may flow along segment 78 (e.g., in one or more non-NFC frequency bands). Non-NFC antenna 40-2 may include one or more return paths coupled between segment 78 and the antenna ground (not shown in FIG. 5 for the sake of clarity). The return paths may include corresponding antenna tuning components for adjusting the frequency response of non-NFC antenna 40-2 in one or more of the non-NFC frequency bands (sometimes referred to herein as far-field frequency bands). The frequency response of non-NFC antenna 40-2 may be determined by the length of the segment 78, one or more resonant modes of slot 60, harmonic modes of segment 78 and/or slot 60, contribution from one or more parasitic elements, and/or antenna tuning components coupled across slot 60, for example.

Non-NFC antenna 40-3 may have an antenna resonating element arm (e.g., an inverted-F antenna resonating element arm) formed from segment 80 of peripheral conductive housing structures 12W. Antenna feed 50-3 for non-NFC antenna 40-3 may be coupled to segment 80 and conductive support plate 58 (e.g., across slot 60). Corresponding antenna currents for non-NFC antenna 40-3 may flow along segment 80 (e.g., in one or more non-NFC frequency bands).

Non-NFC antenna 40-3 may include one or more return paths coupled between segment 80 and the antenna ground (not shown in FIG. 5 for the sake of clarity). The return paths may include corresponding antenna tuning components for adjusting the frequency response of non-NFC antenna 40-3 in one or more of the non-NFC frequency bands. The frequency response of non-NFC antenna 40-3 may be determined by the length of the segment 80, one or more resonant modes of slot 60, harmonic modes of segment 80 and/or slot 60, contribution from one or more parasitic elements, and/or antenna tuning components coupled across slot 60, for example. Antenna feeds 50-1, 50-2, and 50-3 may sometimes be referred to herein as non-NFC antenna feeds or far-field antenna feeds.

When operating using a single non-NFC antenna, a single stream of wireless data may be conveyed between device 10 and external communications equipment (e.g., one or more other wireless devices such as wireless base stations, access points, cellular telephones, computers, etc.). This may impose an upper limit on the data rate (data throughput) obtainable by wireless circuitry 34 (FIG. 2) in communicating with the external communications equipment. As software applications and other device operations increase in complexity over time, the amount of data that needs to be conveyed between device 10 and the external communications equipment typically increases, such that a single antenna may not be capable of providing sufficient data throughput for handling the desired device operations.

In order to increase the overall data throughput of wireless circuitry 34, two or more of non-NFC antennas 40-1, 40-2, and 40-3, and/or additional non-NFC antennas in device 10 may be operated using a multiple-input and multiple-output (MIMO) scheme in one or more of the non-NFC frequency bands. When operating using a MIMO scheme, two or more of the non-NFC antennas may be used to convey multiple independent streams of wireless data at the same frequencies. This may significantly increase the overall data throughput between device 10 and the external communications equipment relative to scenarios where only a single antenna is used.

In some scenarios, to support near-field communications in device 10, device 10 may include a dedicated NFC antenna. However, as space is at a premium in devices such as device 10, forming a dedicated NFC antenna may occupy an excessive amount of space in device 10 that could otherwise be occupied by other device components. Space can be conserved by using portions of non-NFC antenna 40-2 and non-NFC antenna 40-3 to form part of an NFC antenna for device 10. As an example, device 10 may include an NFC antenna 40NFC that is formed from portions of segment 78, segment 80, and conductive support plate 58.

As shown in FIG. 5, NFC antenna 40NFC may include a conductive loop path 114 that conveys antenna current I in an NFC frequency band (e.g., for transmission and/or reception of corresponding NFC signals). Conductive loop path 114 form a loop antenna resonating element for NFC antenna 40NFC. Conductive loop path 114 may include segment 78 and segment 80 of peripheral conductive housing structures 12W. By sharing conductive antenna structures between both NFC antenna 40NFC and non-NFC antennas 40-2 and 40-3, duplicative conductive structures can be minimized and antenna volume can be conserved within device 10. At the same time, conductive loop path 114 may extend across substantially all of the width of device 10 (e.g., across the lengths of both non-NFC antennas 40-2 and 40-3). This may, for example, facilitate the use of device 10 for a user who is using device 10 to communicate with external NFC equipment such as an NFC (e.g., RFID) reader (e.g., so that the user does not have to focus on precisely placing device 10 over the NFC reader so that the volume of NFC antenna 40NFC is aligned with the NFC reader).

NFC transceiver circuitry 38 may transmit and/or receive NFC signals using NFC antenna 40NFC. NFC transceiver circuitry 38 may be mounted to a dedicated substrate (e.g., a rigid printed circuit board or flexible printed circuit), may be mounted to the main logic board for device 10, or may be mounted to flexible printed circuit structures 72. Flexible printed circuit structures 72 may include a single flexible printed circuit or multiple flexible printed circuits coupled together (e.g., using a surface mount technology (SMT) process).

In order to optimize the wireless performance of NFC antenna 40NFC, NFC transceiver circuitry 38 may feed NFC antenna 40NFC using differential signals in an NFC frequency band. For example, as shown in FIG. 5, NFC transceiver circuitry 38 may have a differential output that includes signal terminals 62 and 66 (e.g., a pair of differential signal terminals). signal terminals 62 and 66 may, for example, form a differential pair of antenna feed terminals (sometimes referred to collectively herein as differential antenna feed 50D) for NFC antenna 40NFC. Signal terminal 62 (sometimes referred to herein as first differential antenna feed terminal 62) may be coupled to point 76 on segment 78 of peripheral conductive housing structures 12W via conductive path 68. Signal terminal 66 (sometimes referred to herein as second differential antenna feed terminal 66) may be coupled to point 102 on segment 80 of peripheral conductive housing structures 12W via conductive path 70. Conductive paths 68 and 70 may, for example, form a differential signal path (sometimes referred to herein as a differential signal transmission line). NFC transceiver circuitry 38 may be coupled to ground (e.g., conductive support plate 58) via ground terminal 64.

During operation of NFC transceiver circuitry 38, differential signals across signal terminals 62 and 66 are transmitted and/or received by conductive loop path 114 of NFC antenna 40NFC (e.g., the loop antenna resonating element for NFC antenna 40NFC). The differential signals may include a differential signal pair S+/S−. Differential signal S+ of the differential signal pair may be conveyed over signal terminal 62, conductive path 68, and point (terminal) 76 on segment 78 of peripheral conductive housing structures 12W. Differential signal S− of the differential signal pair may be conveyed over signal terminal 66, conductive path 70, and point (terminal) 102 on segment 80 of peripheral conductive housing structures 12W. Antenna currents I (e.g., loop currents) corresponding to the differential signals may flow between signal terminals 62 and 66 (e.g., over conductive loop path 114).

The conductive loop path 114 for antenna currents I may extend from signal terminal 62 to signal terminal 66 through conductive path 68, conductive path 70, and portions of non-NFC antennas 40-2 and 40-3. For example, as shown in FIG. 5, conductive loop path 114 may include conductive path 68, at least a portion of segment 78 of peripheral conductive housing structures 12W, a conductive path coupled between segment 78 and conductive support plate 58 such as a conductive path that includes inductor 86, a conductive path coupled between conductive support plate 58 and segment 80 of peripheral conductive housing structures 12W (e.g., at gap 18-2) such as a conductive path that includes inductor 88, a conductive path extending between inductors 86 and 88 such as conductive path 115, at least a portion of segment 80 of peripheral conductive housing structures 12W, and conductive path 70. This may configure conductive loop path 114 to extend across an entirety of the width of device 10.

Inductor 86 may have a first terminal 94 coupled to segment 78 at a location on segment 78 that is interposed between knuckle 118 and antenna feed 50-2 (e.g., terminal 94 may be interposed on segment 78 between antenna feed 50-2 and knuckle 118 whereas point 76 is interposed on segment 78 between antenna feed 50-2 and gap 18-1). Inductor 86 may have a second terminal 96 coupled to conductive support plate 58. Antenna feed 50-2 may be coupled to segment 78 at a location that is interposed between point 76 and terminal 94. Inductor 88 may have a first terminal 100 coupled to an end of segment 80 (e.g., at gap 18-2) and a second terminal 98 coupled to conductive support plate 58. Antenna feed 50-3 may be coupled to segment 80 at a location that is interposed between point 102 and terminal 100 (e.g., terminal 100 may be interposed on segment 80 between antenna feed 50-3 and gap 18-2 whereas point 102 is interposed on segment 80 between antenna feed 50-3 and gap 18-3). Conductive path 115 may extend from terminal 96 to terminal 98 and may form a portion of conductive loop path 114. Conductive path 115 may be formed from the portion of conductive support plate 58 extending between terminals 96 and 98 (e.g., at edge 59) and/or may include conductive traces on a substrate such as flexible printed circuit 108. Flexible printed circuit 108 may be formed as a part of flexible printed circuit structures 72 or may be separate from flexible printed circuit structures 72. Flexible printed circuit 108 may be omitted if desired.

If desired, inductor 86 may be formed as a part of interconnect structures 104. Interconnect structures 104 may include a conductive clip, a conductive pin, a conductive spring, conductive adhesive, solder, welds, conductive foam, a conductive bracket, a conductive screw, a conductive fastener, a conductive screw boss, a conductive (e.g., radio-frequency) connector, conductive traces, strips of metal, sheet metal, a flexible printed circuit (e.g., a flexible printed circuit that is separate from flexible printed circuit 108 or that forms a part of flexible printed circuit 108 in scenarios where flexible printed circuit 108 is used to form a substrate for conductive traces in conductive path 115), and/or any other desired structures that couple segment 78 to conductive support plate 58 between antenna feed 50-2 and knuckle 118.

In scenarios where interconnect structures 104 include a flexible printed circuit, inductor 86 may include an SMT inductor mounted to the flexible printed circuit. In scenarios where interconnect structures 104 do not include a flexible printed circuit, inductor 86 may be formed from an elongated conductive member that is configured to exhibit a selected inductance, as an example. If desired, an antenna tuning component for non-NFC antenna 40-2 may also be mounted to or formed from interconnect structures 104 (e.g., interconnect structures 104 may include inductors, capacitors, switches, resistors, and/or any other components arranged in any desired manner for tuning the frequency response of antenna 40-2 in one or more non-NFC frequency bands such as within a cellular low band).

If desired, inductor 88 may be formed as a part of interconnect structures 106. Interconnect structures 106 may include a conductive clip, a conductive pin, a conductive spring, conductive adhesive, solder, welds, conductive foam, a conductive bracket (e.g., a mounting bracket for a camera overlapping conductive support plate 58 that optionally couples conductive structures on the camera sensor to ground), a conductive screw, a conductive fastener, a conductive screw boss, a conductive (e.g., radio-frequency) connector, conductive traces, strips of metal, sheet metal, a flexible printed circuit (e.g., a flexible printed circuit that is separate from flexible printed circuit 108 or that forms a part of flexible printed circuit 108 in scenarios where flexible printed circuit 108 is used to form a substrate for conductive traces in conductive path 115), and/or any other desired structures that couple terminal 100 on segment 80 to terminal 98 on conductive support plate 58. In scenarios where interconnect structures 106 include a flexible printed circuit, inductor 88 may include an SMT inductor mounted to the flexible printed circuit. In scenarios where interconnect structures 106 do not include a flexible printed circuit, inductor 88 may be formed from an elongated conductive member that is configured to exhibit a selected inductance, as an example. If desired, an antenna tuning component for non-NFC antenna 40-3 may also be mounted to or formed from interconnect structure 106 (e.g., for tuning the frequency response of non-NFC antenna 40-3 in one or more non-NFC frequency bands).

As shown in FIG. 5, an inductor such as inductor 74 may be interposed on conductive path 68. Inductor 74 may have a terminal coupled to point 76 on segment 78 and a second terminal coupled to signal terminal 62. Inductor 74 may be mounted to flexible printed circuit structures 72 or may be separate from flexible printed circuit structures 72. If desired, antenna tuning components for non-NFC antenna 40-2 and/or non-NFC antenna 40-1 may also be mounted to flexible printed circuit structures 72 (e.g., for tuning the frequency response of non-NFC antennas 40-1 and 40-2 in one or more non-NFC frequency bands).

Similarly, an inductor such as inductor 90 may be interposed on conductive path 70. Inductor 90 may have a first terminal coupled to point 102 on segment 80 and a second terminal coupled to signal terminal 66. Inductor 90 may be mounted to flexible printed circuit structures 72 or may be separate from flexible printed circuit structures 72. If desired, antenna tuning components for non-NFC antenna 40-3 may also be mounted to flexible printed circuit structures 72 (e.g., for tuning the frequency response of non-NFC antenna 40-3 in one or more non-NFC frequency bands). Inductors 74, 86, 88, and/or 90 may each partially or entirely overlap slot 60 if desired.

Conductive path 68 may, for example, include conductive traces on flexible printed circuit structures 72 (e.g., the same flexible printed circuit used as a substrate for inductor 74 or a different flexible printed circuit). Conductive path 70 may, for example, include conductive traces on flexible printed circuit structures 72 (e.g., the same flexible printed circuit used as a substrate for inductor 74 or a different flexible printed circuit, the same flexible printed circuit used as a substrate for conductive path 68 or a different flexible printed circuit, etc.).

If desired, a high-pass filter such as capacitor 110 may be coupled between antenna feed 50-2 and segment 78. Capacitor 110 may form a short circuit impedance or a very low impedance (e.g., an impedance less than a threshold impedance) in the non-NFC frequency bands handled by non-NFC antenna 40-2. When non-NFC antenna 40-2 is transmitting non-NFC signals, antenna feed 50-2 may produce antenna currents (e.g., currents at frequencies in the non-NFC frequency bands handled by non-NFC antenna 40-2) that flow along segment 78 of peripheral conductive housing structures 12W. The antenna currents may produce corresponding non-NFC signals that are radiated into free space. When non-NFC antenna 40-2 is receiving non-NFC signals, the received non-NFC signals may produce antenna currents on segment 78. The corresponding non-NFC signals may be provided to non-NFC transceiver circuitry 36 over antenna feed 50-2. Inductor 74 and inductor 86 may have inductances that configure the inductors to form low-pass filters that block antenna currents in the non-NFC frequency bands from passing from segment 78 onto conductive support plate 58 or conductive path 68 (e.g., inductors 74 and 86 may form open circuit impedances or very high impedances such as impedances that are greater than a threshold impedance in the non-NFC frequency bands handled by non-NFC antenna 40-2). This may, for example, prevent the non-NFC signals handled by non-NFC antenna 40-2 from interfering with the operation of NFC transceiver circuitry 38.

If desired, a high-pass filter such as capacitor 112 may be coupled between antenna feed 50-3 and segment 80. Capacitor 112 may form a short circuit impedance or a very low impedance (e.g., an impedance less than a threshold impedance) in the non-NFC frequency bands handled by non-NFC antenna 40-3. When non-NFC antenna 40-3 is transmitting non-NFC signals, antenna feed 50-3 may produce antenna currents (e.g., currents at frequencies in the non-NFC frequency bands handled by non-NFC antenna 40-3) that flow along segment 80 of peripheral conductive housing structures 12W. The antenna currents may produce corresponding non-NFC signals that are radiated into free space. When non-NFC antenna 40-3 is receiving non-NFC signals, the received non-NFC signals may produce antenna currents on segment 80. The corresponding non-NFC signals may be provided to non-NFC transceiver circuitry 36 over antenna feed 50-3. Inductor 88 and inductor 90 may have inductances that configure the inductors to form low-pass filters that block antenna currents in the non-NFC frequency bands from passing from segment 80 onto conductive support plate 58 or conductive path 70 (e.g., inductors 88 and 90 may form open circuit impedances or very high impedances such as impedances that are greater than a threshold impedance in the non-NFC frequency bands handled by non-NFC antenna 40-3). This may, for example, prevent the non-NFC signals handled by non-NFC antenna 40-3 from interfering with the operation of NFC transceiver circuitry 38.

The low-pass filters formed from inductors 74, 86, 88, and 90 pass the NFC signals handled by NFC transceiver circuitry 38 (e.g., inductors 74, 86, 88, and 90 may form short circuit impedances or very low impedances that are less than a threshold impedance in the NFC frequency band). Capacitors 110 and 112 may block relatively low frequency current such as antenna current I from passing onto antenna feeds 50-2 and 50-3 and interfering with the operation of non-NFC transceiver circuitry 36. When NFC antenna 40NFC is transmitting NFC signals, differential antenna feed 50D may produce antenna current I at frequencies in the NFC frequency band. Antenna current I may flow along conductive loop path 114. For example, antenna current I may flow through signal terminal 62, through conductive path 68, through inductor 74, through segment 78 (e.g., through the portion of segment 78 extending between point 76 and terminal 94 of inductor 86), through inductor 86, through conductive path 115, through inductor 88, through segment 80 (e.g., between terminal 100 of inductor 88 and point 102), through inductor 90, through conductive path 70, and through signal terminal 66. Corresponding NFC signals may be radiated into free space. Similarly, when NFC antenna 40NFC is receiving NFC signals, the received signals may produce antenna currents I on conductive loop path 114. The corresponding NFC signals may be provided to NFC transceiver circuitry 38 over differential antenna feed 50D.

The example of FIG. 5 is merely illustrative. Inductors 75, 86, 88, and 90 may each include any desired number of fixed or adjustable inductive components (e.g., discrete or continuous inductors) coupled together in any desired manner. Slot 60, segment 78, segment 80, and conductive loop path 114 may have other shapes (e.g., shapes having any desired number of straight and/or curved portions and any desired number of straight and/or curved edges).

When configured using the arrangement of FIG. 5, antenna current I may run between segment 78 and conductive support plate 58 at a location that is relatively far from segment 80 and point 102 (e.g., at a location that is near to the central longitudinal axis of device 10). In scenarios where flexible printed circuit 108 is omitted (e.g., scenarios where conductive path 115 of conductive loop path 114 runs through conductive support plate 58), if care is not taken, this relatively large distance may cause some of the antenna current I along conductive path 115 to leak around the edges of opening 122, as shown by path 120. This current leakage between terminals 96 and 98 may undesirably limit the overall field strength and/or effective volume of NFC antenna 40NFC. In order to mitigate these issues, inductor 86 may be coupled between knuckle 118 and conductive support plate 58.

Figure 6:
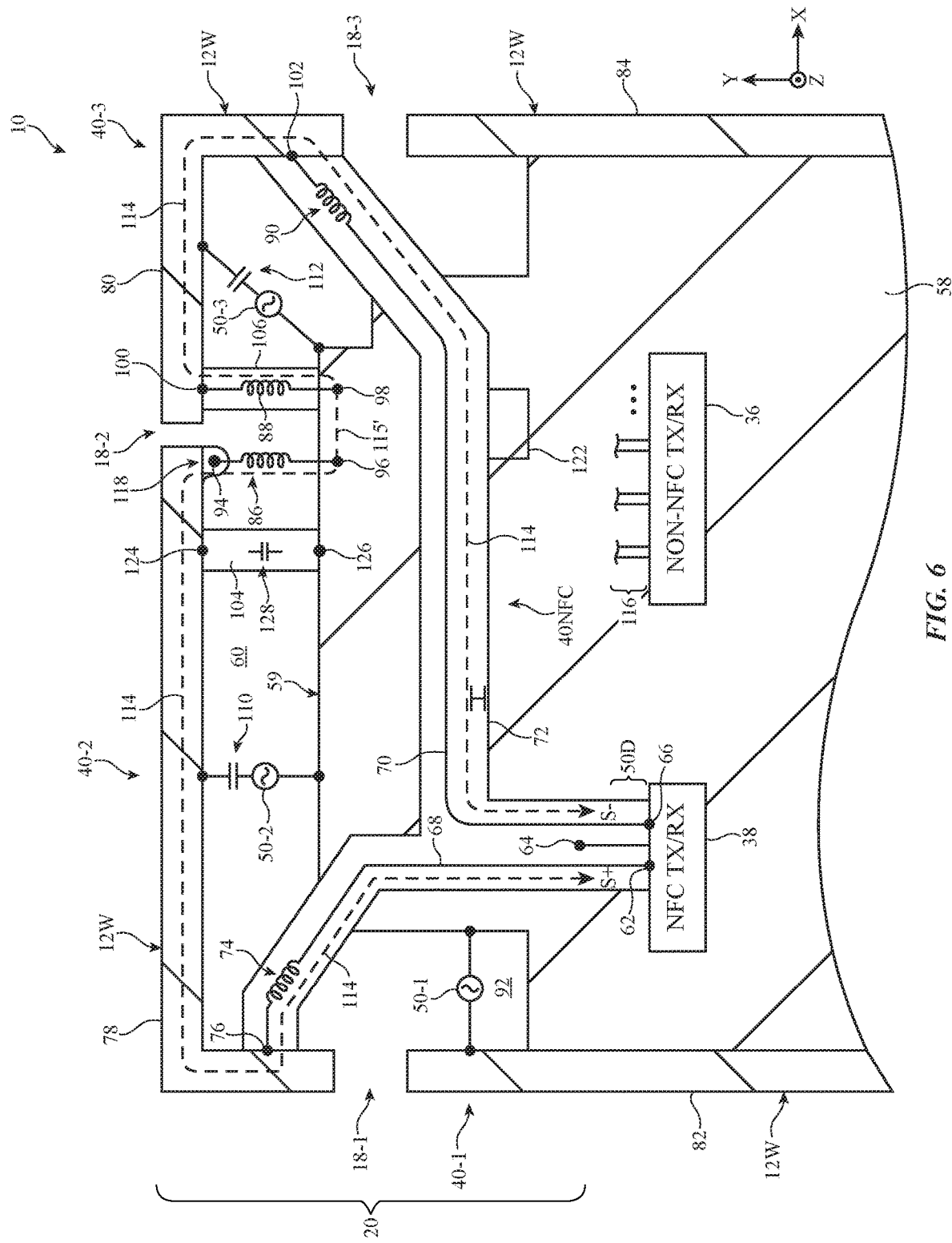
FIG. 6 is a top view of an illustrative differential-fed near-field communications antenna having an inductor coupled between an end of an antenna resonating element arm for a non-near-field-communications antenna and a conductive support plate in accordance with some embodiments.

FIG. 6 is a diagram showing how inductor 86 may be coupled between knuckle 118 and conductive support plate 58. As shown in FIG. 6, terminal 94 of inductor 86 may be coupled to knuckle 118 (e.g., terminal 94 may be coupled to the end of segment 78 and thus the end of the antenna resonating element arm of non-NFC antenna 40-2 at gap 18-2). Interconnect structures 104 may remain coupled between segment 78 (e.g., at terminal 124) and conductive support plate 58 (e.g., at terminal 126). Interconnect structures 104 may, for example, include an antenna tuning component for tuning the frequency response of non-NFC antenna 40-2 in one or more non-NFC frequency bands (e.g., the cellular low band). If desired, interconnect structures 104 may include a high pass filter such as capacitor 128 coupled between terminals 124 and 126. The high pass filter (e.g., capacitor 128) may pass antenna currents in the non-NFC frequency bands handled by non-NFC antenna 40-2 while blocking antenna currents I in the NFC frequency band (e.g., capacitor 128 may prevent antenna current I from shorting to terminal 126).

Terminal 124 may be interposed on segment 78 between knuckle 118 (terminal 94) and antenna feed 50-2. Terminal 126 may be interposed on conductive support plate 58 (e.g., at edge 59) between antenna feed 50-2 and terminal 96 of inductor 86 (e.g., terminal 96 may be located farther away from the central longitudinal axis of device 10 than in the arrangement of FIG. 5 such that terminal 96 is interposed between terminal 126 and terminal 98 of inductor 88). Conductive loop path 114 may include conductive path 115' on conductive support plate 58, extending between terminals 96 and 98 (e.g., conductive path 115' of FIG. 6 may be shorter than conductive path 115 of FIG. 5). Coupling inductor 86 to segment 78 at or adjacent to gap 18-2 (e.g., at knuckle 118) may prevent the formation of leakage current around opening 122 as the current passes between terminals 96 and 98. This may serve to maximize the overall field strength (e.g., by as much as 1.3 dB or more) and the effective volume of NFC antenna 40NFC (e.g., by as much as 50% or more).

Figure 7:
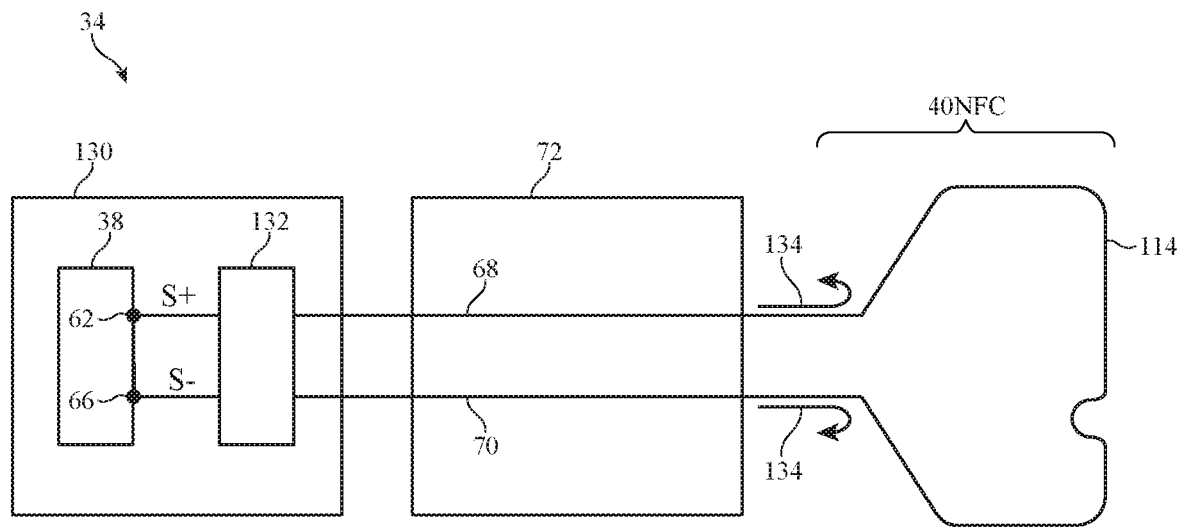
FIG. 7 is a schematic diagram showing how illustrative impedance matching circuitry may be coupled between near-field communications transceiver circuitry and a near-field communications antenna in accordance with some embodiments.

If desired, impedance matching circuitry may be coupled between NFC transceiver circuitry 38 and NFC antenna 40NFC to help match the impedance of NFC transceiver circuitry 38 with the impedance of NFC antenna 40NFC. FIG. 7 is a schematic diagram showing how impedance matching circuitry may be coupled between NFC transceiver circuitry 38 and NFC antenna 40NFC in one suitable arrangement.

As shown in FIG. 7, wireless circuitry 34 may include NFC transceiver circuitry 38 mounted to an underlying substrate 130 (e.g., a main logic board for device 10). Signal terminals 62 and 66 of NFC transceiver circuitry 38 may be coupled to conductive paths 68 and 70, respectively, via impedance matching circuitry 132 (e.g., an impedance matching network formed on substrate 130). Conductive paths 68 and 70 may pass through flexible printed circuit structures 72 to opposing ends of conductive loop path 114 of NFC antenna 40NFC.

Impedance matching circuitry 132 may include a network of inductive, capacitive, and/or resistive components that help to match the impedance of NFC transceiver circuitry 38 to the impedance of NFC antenna 40NFC. However, because impedance matching circuitry 132 is relatively far from conductive loop path 114 in this example, a relatively high amount of radio-frequency energy provided to NFC antenna 40NFC (e.g., by differential signal pair S+/S−) may be reflected back towards NFC transceiver circuitry 38, as shown by arrows 134. This may limit the overall antenna efficiency and performance of NFC antenna 40NFC.

Figure 8:
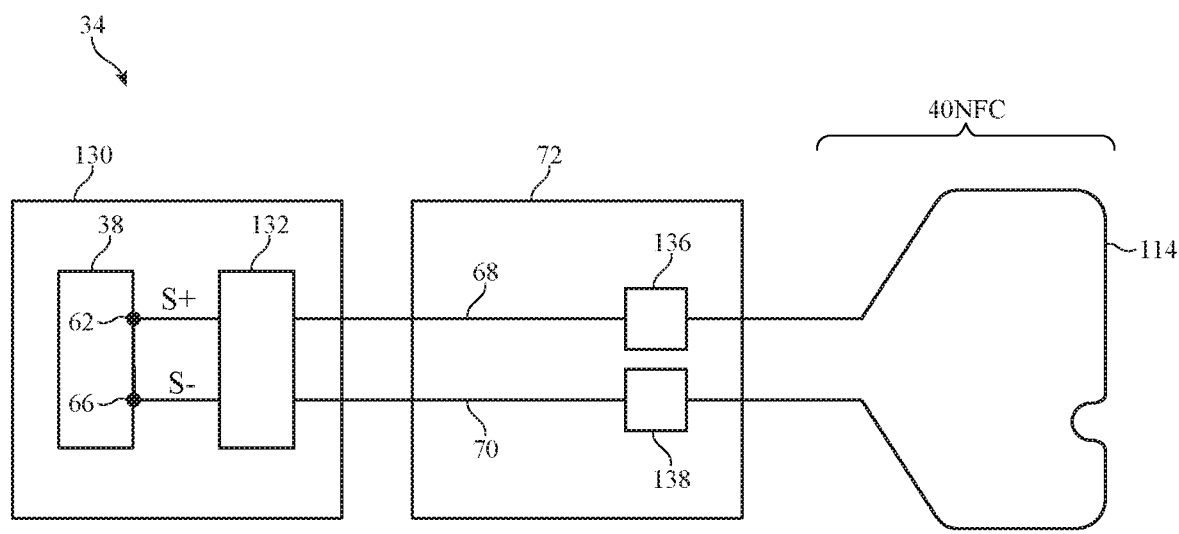
FIG. 8 is a schematic diagram showing how illustrative impedance matching circuitry for a near-field communications antenna may be distributed between a main logic board and flexible printed circuit structures in accordance with some embodiments.

In order to further optimize impedance matching for NFC antenna 40NFC, additional impedance matching circuits may be formed on flexible printed circuit structures 72. FIG. 8 is a schematic diagram showing how additional impedance matching circuits may be formed on flexible printed circuit structures 72.

As shown in FIG. 8, flexible printed circuit structures 72 may include additional impedance matching circuits such as impedance matching circuit 136 and impedance matching circuit 138. Impedance matching circuit 136 may be interposed on conductive path 68 (e.g., at NFC antenna 40NFC and interposed between inductor 74 (FIGS. 5 and 6) and impedance matching circuitry 132). Impedance matching circuit 136 may include a network of inductive, capacitive, and/or resistive components that help to match the impedance of conductive path 68 to the impedance of NFC antenna 40NFC. Similarly, impedance matching circuit 138 may be interposed on conductive path 70 (e.g., at NFC antenna 40NFC and interposed between inductor 90 (FIGS. 5 and 6) and impedance matching circuitry 132). Impedance matching circuit 138 may include a network of inductive, capacitive, and/or resistive components that help to match the impedance of conductive path 70 to the impedance of NFC antenna 40NFC.

Impedance matching circuits 136 and 138 may help improve the impedance match between NFC transceiver circuitry 38 and NFC antenna 40NFC relative to arrangements in which impedance matching circuits 136 and 138 are omitted. As one example, in the arrangement of FIG. 7, impedance matching circuitry 132 may exhibit a capacitance of 3300 pF while conductive paths 68 and 70 and/or other structures on flexible printed circuit structures 72 exhibit a capacitance of 47 pF to create a peak coupling efficiency of −16.9 dB. However, in the arrangement of FIG. 8, impedance matching circuits 136 and 138 may exhibit a capacitance of 3300 pF while impedance matching circuitry 132 exhibits a capacitance of 200 pF, as just one example. Redistributing the impedance matching components for NFC antenna 40NFC in this way may increase peak coupling efficiency to −15.2 dB while also increasing the effective operational volume of NFC antenna 40NFC by as much as 2 dB or greater.

In one suitable arrangement, the impedance matching scheme of FIG. 7 may be used when NFC antenna 40NFC includes an inductor 86 in interconnect structures 104 (e.g., as shown in FIG. 5) whereas the impedance matching scheme of FIG. 8 is used when NFC antenna 40NFC includes an inductor 86 coupled to knuckle 118 (e.g., as shown in FIG. 6). This is merely illustrative and, in general, the impedance matching schemes of FIG. 7 or 8 may be used in either of the arrangements of FIGS. 5 and 6. Other impedance matching schemes may be used if desired.

Figure 9:
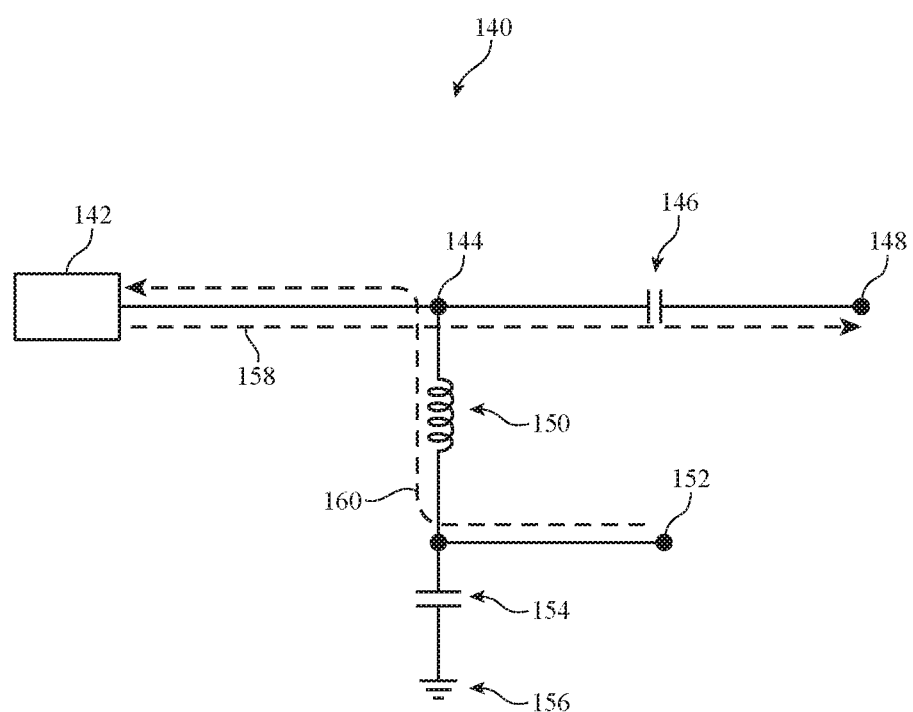
FIG. 9 is a circuit diagram of an illustrative antenna tuning component for a non-near-field communications antenna that also performs impedance matching for a near-field communications antenna in accordance with some embodiments.

Additionally or alternatively, one or more antenna tuning components for non-NFC antenna 40-2 and/or non-NFC antenna 40-3 may also be used to perform impedance matching in the NFC frequency band for NFC antenna 40NFC. FIG. 9 is a circuit diagram of one illustrative antenna tuning component for non-NFC antenna 40-2 or non-NFC antenna 40-3 that may also be used to perform impedance matching for NFC antenna 40NFC.

As shown in FIG. 9, antenna tuning component 140 may include a short pin clip 142, a capacitor 146, an inductor 150, and a capacitor 154. Capacitor 146, inductor 150, and capacitor 154 may be formed on flexible printed circuit structures 72 of FIGS. 5-8, for example. Short pin clip 142 may be coupled to circuit node 144 and to segment 78 or segment 80 (FIGS. 5 and 6) to form a return path for non-NFC antennas 40-2 or 40-3. Capacitor 146 may be coupled between circuit node 144 and terminal 148. Terminal 148 may, for example, be coupled to conductive traces on the flexible printed circuit structures, the conductive support plate, or elsewhere. Inductor 150 may be coupled between circuit node 144 and NFC input terminal 152. NFC input terminal 152 may be coupled to conductive path 68 (signal terminal 62) or conductive path 70 (signal terminal 66) of FIGS. 5-8. Capacitor 154 may be coupled between NFC input terminal 152 and ground terminal 156.

Inductor 150 may have an inductance that configures inductor 150 to block radio-frequency signals in the non-NFC frequency bands handled by the non-NFC antenna. The inductance of inductor 150 may also configure inductor 150 to pass radio-frequency signals in the NFC frequency band. Capacitor 146 may have a capacitance that configures capacitor 146 to block radio-frequency signals in the NFC frequency band. The capacitance of capacitor 146 may also configure capacitor 146 to pass radio-frequency signals in the non-NFC frequency bands. This may cause the radio-frequency signals in the non-NFC frequency bands to pass from short pin clip 142 to ground through capacitor 146 and terminal 148, as shown by arrow 158. This may also cause the radio-frequency signals in the NFC frequency band to pass from NFC input terminal 152 to the antenna resonating element arm of the non-NFC antenna (e.g., segment 78 or segment 80 of FIGS. 5 and 6) through inductor 150 and short pin clip 142, as shown by arrow 160. Capacitor 154 may have a capacitance that is selected to perform impedance matching in the NFC frequency band for the NFC antenna. If desired, inductor 150 and/or capacitor 154 may help to tune the frequency response of the non-NFC antenna coupled to short pin clip 142. As one example, inductor 150 may have an inductance between 5-10 nH and capacitor 154 may have a capacitance of 40-60 pF. This is example is merely illustrative. Antenna tuning component 140 may have other circuit configurations if desired.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
   a housing having peripheral conductive structures;
   first, second, and third dielectric-filled gaps in the peripheral conductive structures, wherein the first dielectric-filled gap separates first and second segments of the peripheral conductive structures, the second dielectric-filled gap separates the second segment from a third segment of the peripheral conductive structures, and the third dielectric-filled gap separates the third segment from a fourth segment of the peripheral conductive structures;
   a conductive support plate coupled to the first and fourth segments, wherein the conductive support plate is separated from the second and third segments by a slot;
   a first inductor coupled across the slot, wherein the first inductor has a first terminal coupled to the second segment and a second terminal coupled to the conductive support plate;
   a second inductor coupled across the slot, wherein the second inductor has a third terminal coupled to the third segment and a fourth terminal coupled to the conductive support plate; and
   near-field communications (NFC) transceiver circuitry coupled to the second and third segments and configured to convey NFC signals over a conductive loop path that includes a portion of the second segment, the first inductor, a portion of the conductive support plate extending between the second and fourth terminals, the second inductor, and a portion of the third segment.

2. The electronic device of claim 1, further comprising:
   a first conductive path that couples a first signal terminal of the NFC transceiver circuitry to the second segment; and
   a second conductive path that couples a second signal terminal of the NFC transceiver circuitry to the third segment.

3. The electronic device of claim 2, further comprising:
   a third inductor interposed on the first conductive path; and
   a fourth inductor interposed on the second conductive path.

4. The electronic device of claim 3, wherein the NFC signals comprise differential signals and the first and second signal terminals form a differential feed for the conductive loop path.

5. The electronic device of claim 3, further comprising:
   a flexible printed circuit, wherein a portion of the first conductive path, a portion of the second conductive path, the third inductor, and the fourth inductor are formed on the flexible printed circuit.

6. The electronic device of claim 5, further comprising:
   a logic board, wherein the NFC transceiver circuitry is mounted to the logic board; and
   impedance matching circuitry on the logic board, wherein the matching circuitry is interposed on the first and second conductive paths.

7. The electronic device of claim 6, further comprising:
   a first impedance matching circuit on the flexible printed circuit and interposed on the first conductive path between the third inductor and the impedance matching circuitry; and
   a second impedance matching circuit on the flexible printed circuit and interposed on the second conductive path between the fourth inductor and the impedance matching circuitry.

8. The electronic device of claim 1, further comprising:
   a far-field antenna feed coupled between a first point on the second segment and the conductive support plate, wherein the NFC transceiver circuitry is coupled to a second point on the second segment and to a third point on the third segment, the second point is interposed on the second segment between the first point and the first dielectric-filled gap, the first point is interposed on the second segment between the second point and first terminal of the first inductor, and the third terminal of the second inductor is interposed on the third segment between the second dielectric-filled gap and the third point.

9. The electronic device of claim 8, wherein the second segment comprises a knuckle at the second dielectric-filled gap, the first terminal of the first inductor being interposed on the second segment between the first point and the knuckle.

10. The electronic device of claim 8, wherein the second segment comprises a knuckle at the second dielectric-filled gap, the first terminal of the first inductor being coupled to the knuckle.

11. The electronic device of claim 10, wherein the far-field antenna feed is configured to convey radio-frequency signals in a far-field frequency band, the second segment is configured to radiate the radio-frequency signals in the far-field frequency band, and the electronic device further comprises:
    an antenna tuning component coupled between a fourth point on the second segment and the conductive support plate, wherein the antenna tuning component is configured to tune a frequency response of the second segment in the far-field frequency band, the fourth point being interposed on the second segment between the first point and the knuckle.

12. The electronic device of claim 8, wherein the third terminal of the second inductor is coupled to the third segment at the second dielectric-filled gap.

13. The electronic device of claim 12, further comprising:
    an additional far-field antenna feed coupled between a fourth point on the third segment and the conductive support plate, wherein fourth point is interposed on the second segment between the third point and the third terminal of the second inductor.

14. An electronic device comprising:
    a housing having peripheral conductive structures;
    first, second, and third dielectric-filled gaps in the peripheral conductive structures, wherein a first segment of the peripheral conductive structures extends between the first and second dielectric-filled gaps and a second segment of the peripheral conductive structures extends between the second and third dielectric-filled gaps;
    an antenna ground, wherein the first dielectric-filled gap separates the first segment from the antenna ground and the third dielectric-filled gap separates the second segment from the antenna ground;
    a first far-field antenna feed coupled to a first point on the first segment;
    a second far-field antenna feed coupled to a second point on the second segment; and
    near-field communications (NFC) transceiver circuitry having a differential signal feed coupled to a third point on the first segment and a fourth point on the second segment, wherein the third point is interposed on the first segment between the first point and the first dielectric-filled gap, the fourth point is interposed on the second segment between the second point and the third dielectric-filled gap, and the NFC transceiver circuitry is configured to convey differential signals in an NFC frequency band using a conductive loop path that includes a portion of the first segment, a portion of the second segment, and a portion of the antenna ground.

15. The electronic device of claim 14, wherein the conductive loop path comprises:
a first inductor coupled between the first segment and the antenna ground; and
a second inductor coupled between the second segment and the antenna ground, wherein the portion of the antenna ground extends from the first inductor to the second inductor, the first and second segments are configured to radiate in at least one far-field frequency band, and the first and second inductors are configured to block radio-frequency signals in the at least one far-field frequency band.

16. The electronic device of claim 15, further comprising:
an antenna tuning component coupled between the first segment and the antenna ground, wherein the antenna tuning component is configured to tune a frequency response of the first segment in the at least one far-field frequency band and is configured to perform impedance matching for the NFC transceiver circuitry in the NFC frequency band.

17. The electronic device of claim 15, wherein the first inductor is coupled to a fifth point on the first segment, the second inductor is coupled to a sixth point on the second segment, the first point is interposed on the first segment between the fifth point and the third point, and the second point is interposed on the second segment between the sixth point and the fourth point.

18. An electronic device comprising:
a conductive housing wall having a dielectric-filled gap that divides the conductive housing wall into first and second segments;
a logic board;
a flexible printed circuit coupled to the logic board and the first and second segments;
NFC transceiver circuitry mounted to the logic board, wherein the NFC transceiver circuitry has first and second differential signal terminals and is configured to convey differential signals in an NFC frequency band over the first and second differential signal terminals;
a first conductive path on the logic board and the flexible printed circuit, wherein the first conductive path couples the first differential signal terminal to the first segment;
a second conductive path on the logic board and the flexible printed circuit, wherein the second conductive path couples the second differential signal terminal to the second segment; and
impedance matching circuitry on the logic board and interposed on the first and second conductive paths, wherein the impedance matching circuitry is configured to match an impedance of the NFC transceiver circuitry to an impedance of the first and second segments.

19. The electronic device of claim 18, further comprising:
a first impedance matching circuit on the flexible printed circuit and interposed on the first conductive path between the impedance matching circuitry and the first segment; and
a second impedance matching circuit on the flexible printed circuit and interposed on the second conductive path between the impedance matching circuitry and the second segment, wherein the first and second impedance matching circuits are configured to match the impedance of the NFC transceiver circuitry to the impedance of the first and second segments.

20. The electronic device of claim 18, further comprising:
an antenna ground;
a first inductor coupled between the first segment and the antenna ground; and
a second inductor coupled between the second segment and the antenna ground, wherein a portion of the first segment, the first inductor, a portion of the antenna ground extending between the first and second inductors, the second inductor, and a portion of the second segment form part of an NFC loop antenna resonating element.

* * * * *